United States Patent

[11] 3,582,186

[72] Inventor George E. Platzer, Jr.
 Southfield, Mich.
[21] Appl. No. 811,448
[22] Filed Mar. 28, 1969
[45] Patented June 1, 1971
[73] Assignee Chrysler Corporation
 Highland Park, Mich.

[54] COATED RESILIENT DIAPHRAGM IN A FLUID MIRROR
 9 Claims, 5 Drawing Figs.

[52] U.S. Cl. ................................................. 350/279,
 350/267
[51] Int. Cl. ................................................. G02b 5/08,
 G02b 7/18
[50] Field of Search ........................................... 350/276,
 278, 179, 180, 295

[56] References Cited
UNITED STATES PATENTS

| | | | | |
|---|---|---|---|---|
| 3,001,196 | 9/1961 | McIlroy et al. | ............... | 350/295X |
| 3,054,328 | 9/1962 | Rodgers | ............... | 350/295 |
| 3,198,070 | 8/1965 | Platzer et al. | ............... | 350/278X |
| 3,233,515 | 2/1966 | Platzer et al. | ............... | 350/267 |

*Primary Examiner*—John K. Corbin
*Attorney*—Harness, Talburtt and Baldwin

ABSTRACT: A day-night mirror containing a fluid light-controlling medium in an enclosure defined in part by a flexible elastomeric diaphragm. A flexible metal foil covers a major portion of at least one side of the diaphragm for substantially limiting the loss of fluid by permeation.

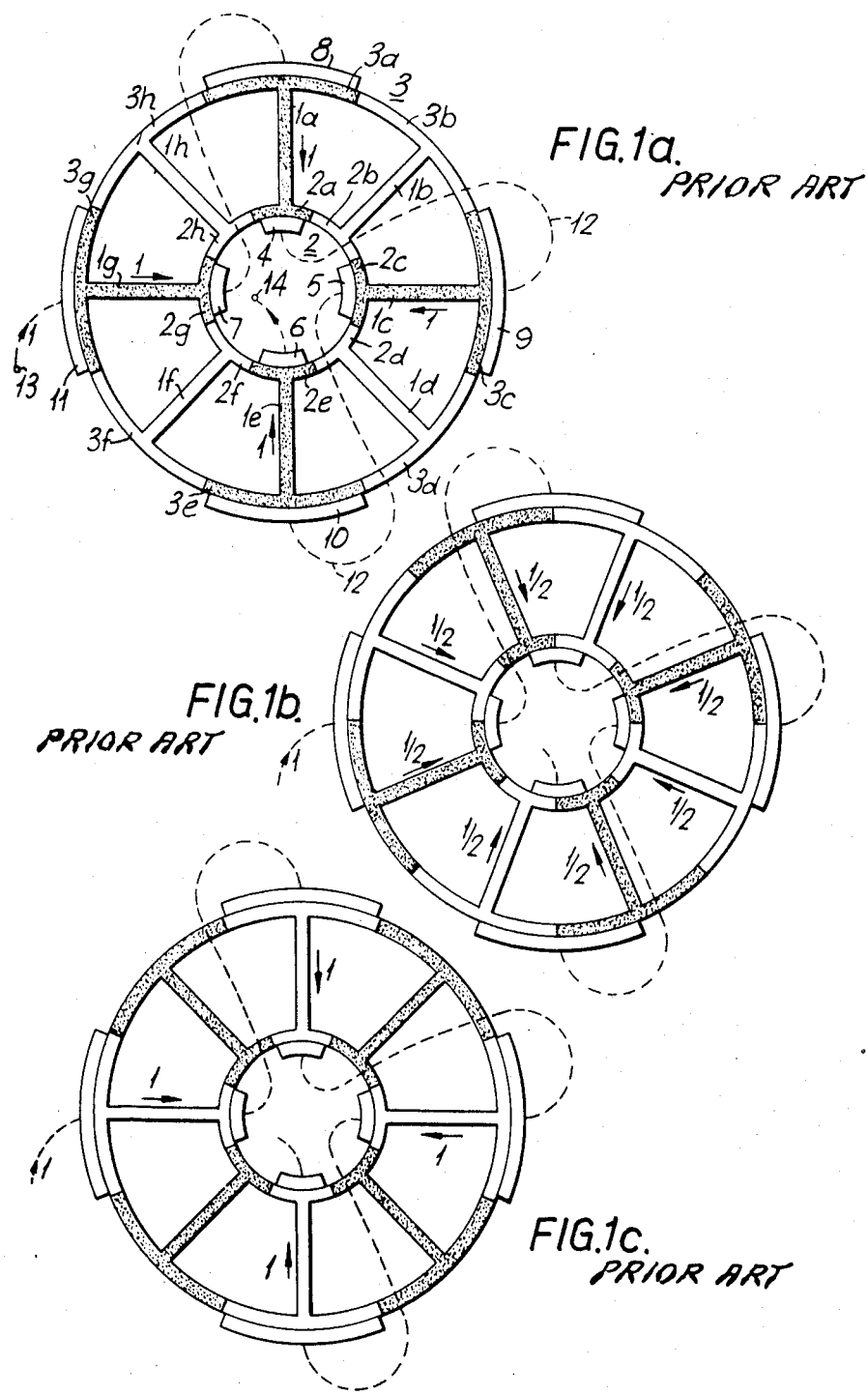

COATED RESILIENT DIAPHRAGM IN A FLUID MIRROR

BACKGROUND OF THE INVENTION

The present invention relates generally to fluid mirrors which are mirrors containing a fluid light-controlling medium. It especially relates to improvements in a day-night rear view mirror of the type disclosed in U.S. PAT. No 3,198,070 which issued to G. E. Platzer, Jr. and L. P. Gau on Aug. 3, 1965, and in U.S. Pat. No. 3,233,515 which issued to G. E. Platzer, Jr., D. M. Teague and H. G. Ross, Jr. on Feb. 8, 1966. These mirrors generally comprise an enclosure including a transparent window and a mirror or other suitable reflector element or means movable relative to the window. The fluid, contained in the enclosure moves between the window and reflector to provide an opaque screen which inhibits light reflections from the reflector under certain conditions of operation. In the absence of the fluid a bright reflection is obtained. The theory and manner of operation is completely described in the referenced patents. In brief, the reflector in the fluid mirror has two positions, a day or bright position and a night or dim position.

In the day position the reflector is positioned essentially flush against the window with no fluid or only a thin film of fluid therebetween. In this position, incident light is reflected primarily at the outside surface of the window, and at the reflector. The reflection at the second surface of the window is normally negligible because the indices of reflection of the window material and the fluid are preferably nearly the same. The intensity of the reflected light in this position is quite high since the reflector has a relatively high reflectivity, preferably on the order of about 80percent.

In the night position, the reflector is moved to a position away from the window; the space provided therebetween fills with the opaque fluid. In this position, incident light is reflected primarily from the front surface of the window. The amount reflected from the reflector element is essentially eliminated due to the presence of the opaque fluid through which the light must pass twice; the first time to reach the reflector, the second time to leave it. As a result, the overall intensity of the light reflected from the reflector is reduced below the threshold of visibility leaving essentially only that light which is reflected by the window. Thus, a dim image exists in the night position due to the decrease in the amount of reflected light.

In the referenced patents there is disclosed, among other forms of fluid mirrors, one which provides an enclosure including a transparent glass plate forming a window for one side of the enclosure (referred to herein as the forward side) and a diaphragm type of fluid-retaining wall for the other side of the enclosure (referred to herein as the rearward side). The diaphragm is preferably made of a resilient, preferably elastomeric material and seals the rearward side of the enclosure. It must be flexible in order to allow for movement of the mirror to which it may be attached and to serve as a means for accommodating changes in volume of the fluid medium caused by changes in temperature.

This structure, while novel in its character, has been found to present a problem of fluid loss due to permeation through the diaphragm. The problem has remained despite the fact that many different types of diaphragm materials have been tested in attempting to find an impermeable one.

SUMMARY OF THE INVENTION

The present invention eliminates the foregoing problem of fluid loss by placing a flexible substantially impermeable coating or layer over a major part of the surface area of at least one side of the diaphragm.

Accordingly, a principal object of the present invention is to provide a fluid mirror containing a composite diaphragm structure which is substantially impermeable to the fluid thereby preventing its loss. Other objects and advantages of the invention will be apparent from the following description and the drawing.

BRIEF DESCRIPTION OF THE DRAWING

FIG. 1 is a side elevational view of an adjustable rear view mirror in its day position and embodying the features of the invention, the mirror assembly being shown in section and the support therefor partly in elevation and partly in section to more clearly show the invention.

FIGS. 4 and 5 are sectional views of an edge portion of the structure of FIG. 1 showing modified forms of the sealing structure between the diaphragm and mirror housing and also the connection between the diaphragm and the reflector.

BRIEF DESCRIPTION OF THE PREFERRED EMBODIMENTS

Figure 2A:
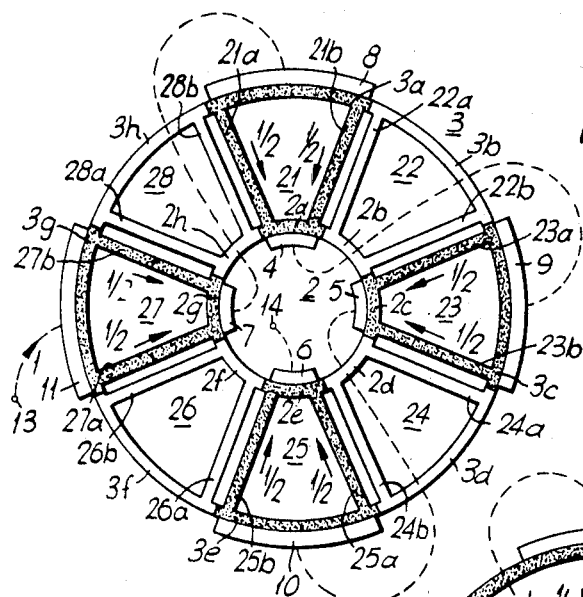
FIG. 2 is an end view and section taken at 2—2 of FIG. 1.
Figure 2B:
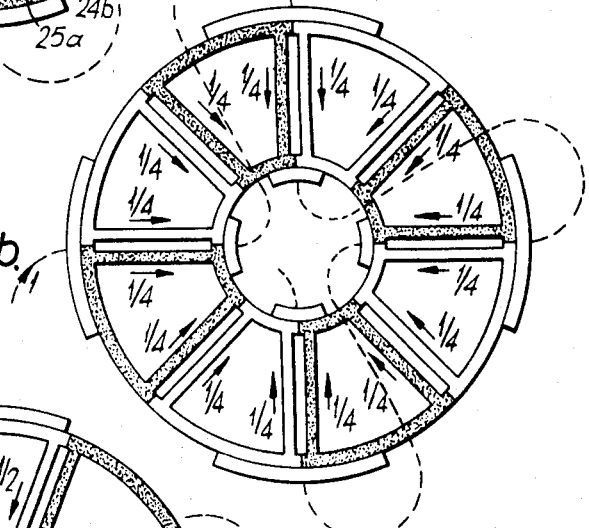
Figure 2C:
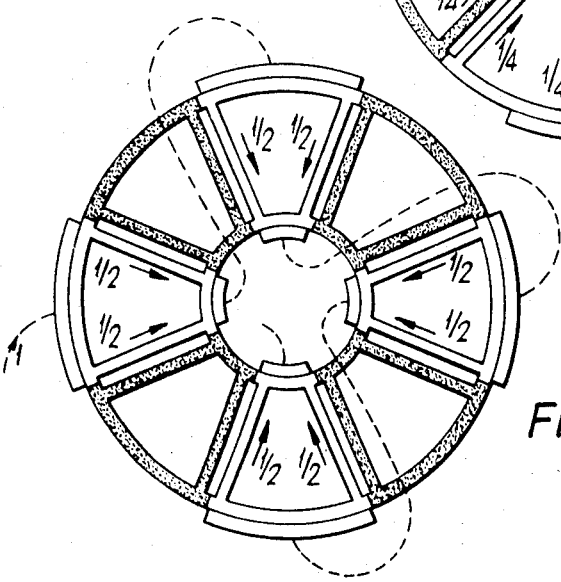
Figure 3:
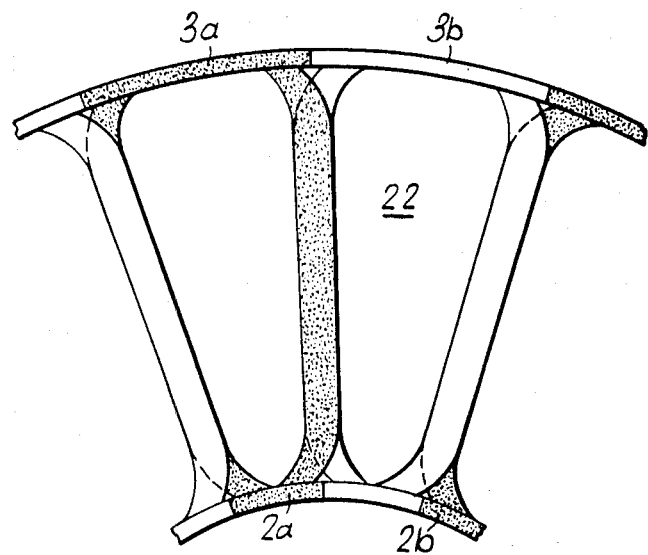
FIG 3 is an enlarged edge portion of the mirror assembly shown in FIG. 1.

Referring to FIGS. 1, 2 and 3, numeral 10 generally designates a side-mounting type adjustable rear view mirror provided with a mounting bracket 11. Secured to head 12 of bracket 11 by screws 13 is a housing 14 with a wall 16 surrounding the mirror assembly, generally designated 22, to protect it from the weather. Mirror assembly 22 is preferably pivotally supported on a spherical headed hollow sleeve 24 which is slidably mounted in a cable guide and control mount 26. The latter comprises an enlarged head portion 28 having a tapered stem 32 extending rearwardly into bracket head 12 and secured in a complementary shaped bore 34 by screw 36. Head portion 28 is provided with rearwardly extending cable-receiving bosses 38 at three equally spaced angular positions around the circumference of the flange to provide threaded recesses 40 in which coiled sheathing 41 of cables 42, 44 and 46 is threaded. These cables connect, as seen in FIG. 2, at corresponding positions to mirror assembly 22 for providing swivel adjustment. Spherical headed sleeve 24 is biased forwardly, preferably by a conical compression spring 48, so as to seat in bearing depression 50 provided in an outward or rearward extending projection 52 of support plate 54. An opposite balanced force is furnished assembly 22 by mirror adjustment cables 42, 44 and 46 which operate in flexible tubes or sheaths 41 and are constantly under tension. The mirror adjustment cables are connected to a manual control means (not shown). Specific details of a suitable three-wire control such as here contemplated for making angular mirror adjustments are referenced in U.S. Pat. No. 3,233,515.

Mirror assembly 22 comprises, in addition to support plate 54, a circular window 60, a circular metal frame 62 of L-section, and a flexible diaphragm 64, the last three named parts forming an enclosure for receiving a movable mirror element or other suitable reflector means generally designated by numeral 66 and providing a fluid chamber 68 for receiving an opaque fluid 70 which may be of the type described in the referenced patents. Window 60 preferably comprises a plate of clear transparent glass. Reflector 66 may likewise be a glass plate provided with a mirrored surface 72. Mirrored surface 72 is clearly visible through window 60 and acts as the reflecting surface for the mirror when in the bright or day position as shown in FIG. 1 wherein reflector 66 is positioned against the stops or indexing means 76.

It will be noted that reflector 66 has a predetermined diameter, which is less than the inside diameter of annular portion 78 of frame 62, providing an annular gap 80 between the outer edge of the reflector 66 and casing portion 78. This gap permits the free movement of the fluid between reflector 66 and casing 78 when reflector 66 is moved rearwardly in chamber 68. In this operation reflector 66 will generally slide on a film of the fluid in the bottom of the enclosure and will be supported to some extent by diaphragm 64, of which a central portion 82 is bonded by a suitable cement to rear face 84 of reflector 66. The enclosure is of sufficient depth to permit displacement of reflector 66 rearwardly a sufficient distance to satisfy the optical conditions required of the mirror when in the night position. That is, a layer of fluid must be provided between the reflector and window which substantially inhibits the reflection of light from mirrored surface 72 when in the rearward or night position. As described in the patents aforesaid, a movement in the order of about 0.125 inch has been found sufficient with the particular fluid medium described therein.

Diaphragm 64 is a resilient material, preferably an elastomeric one such as a nitrile rubberlike synthetic acrylonitrile butadiene copolymer (commonly known as Buna-N), a butyl rubber, polyurethane rubber, silicone rubber or the like. Natural rubbers are also acceptable. An impervious flexible coating 65 is placed over a substantial part of the surface area of at least one side of diaphragm 64 as shown in the Figures. This coating preferably takes the form of an aluminum foil for example and may be bonded to diaphragm 64 by means of a suitable adhesive.

If the diaphragm material is the preferred acrylonitrile butadiene copolymer, alodized aluminum foil may be readily bonded thereto with Chemlok 205 which is an adhesive marketed by the Hughson Chemical Company of Erie, Pa. This material is a mixture of polymers, organic compounds and mineral fillers in a methyl isobutyl ketone solvent system. It is gray in color and has a solids content of 22—26 percent, a specific gravity of 0.92—0.94 at 72° F., a flashpoint of 80° F. (Tayliabue open cup) and a viscosity of 100—130 cps. (Brookfield Model LUF, 02 Spindle, 30 r.p.m., 72° F.). Satisfactory bonds between these materials have been obtained by applying a layer of Chemlok 205 to the diaphragm, laying a 0.0015-inch thick piece of aluminum foil over the adhesive, pressing the diaphragm and foil together and heating at an elevated temperature until cured.

Other adhesives such as cyanoacrylate a contact adhesive marketed by Eastman Kodak and known as Eastman 910, may also be used. The particular bonding agent will depend on the diaphragm and foil materials which are used. The examples described above are provided to more clearly illustrate the invention and are not intended to restrict it or limit it other than as claimed.

Bonding the foil to the rearward side of diaphragm 64 as shown at 65 in FIG. 1 provides a flexible yet impermeable composite. Coating 65 may be bonded to the forward or interior side of diaphragm 64 also. A coating on either side has distinct advantages. It should preferably at least carry a coating on the inner surface where it additionally may serve to prevent any chemical reaction between the diaphragm and the fluid, particularly when the diaphragm is a rubber or elastomer. It may also be carried on the rearward side to prevent any possible oxidation degradation of the diaphragm material. The diaphragm may carry a coating on both sides if desired.

Diaphragm 64 may be of a generally shallow pan shape having a base or body portion 88, an outer rim 90 provided with an inturned lip or flange 92 spaced from body portion 88 the depth of frame 78 such that it snugly embraces and fits the frame. A central portion 82 of diaphragm 64 projects forwardly of the body portion. The central portion is bonded to rear face 84 and is connected to the body portion by a conical web 94. Lip 92 of diaphragm 64 is also preferably provided with a raised bead 96 preferably of semicircular section which may be abutted by window 60 to form a fluid seal between it and the window. Support plate 54, whose periphery conforms to the periphery of angular portion 78 of frame 62 and diaphragm 64, is held in abutment thereto by retaining ring 98 which also holds window 60 against sealing bead 96 of the diaphragm. In this connection it will be noted that retainer 98 has a forward inwardly sloping flange 100 which abuts a complementary shaped chamfered edge 102 of window 60 and at the opposite end is formed with a plurality of tabs 104 (see FIG. 2) spaced circumferentially of the retaining ring. The tabs are bent against support plate 54 adjacent its periphery to hold the entire mirror assembly 22 together while simultaneously placing bead 96 and the opposite end of the diaphragm under sufficient compression to effect a fluid seal of the assembly.

As seen in FIGS. 1 and 2, support plate 54 is preferably provided with an outwardly pressed circular riblike portion 108 and radially outwardly pressed riblike portions 110 which connect with the outwardly pressed portion 52 previously described. Dish portion 52 not only includes a bearing depression 50 for seating the spherical end of sleeve 24 of the mirror mount but also provides an annular depression 112 for receiving one end of a compression spring 114 which seats over projection 50 at its outer end and has its inner end bearing against a platelike member 116 suitably secured as by cementing to portion 82 of diaphragm 64. This arrangement normally biases reflector 66 to its forward position against stops 76. Plate 116 is preferably made of metal and formed with an outward depression 118 in which reflector-acutating cable 120 is anchored by an enlarged head portion 122. Cable 120 extends through opening 124 in bearing portion 50 of the support plate, passes into bore 126 of sleeve 24 in which its coiled sheath 127 is threadedly secured. The cable and sheathing then extend through bracket 11 to its ultimate position of operation, usually the dash of the vehicle. It will also be noted that support plate 54 is provided with three outward depressions 130 located intermediate ribs 110 in which the mirror-positioning cables 42, 44 and 46 are anchored.

As is evident from the above description the outer face of window 60 provides a reflecting surface of low reflectivity which will provide the surface of greatest reflecting intensity in the night position of reflector 66 when the latter is in its rearward or night position. Mirrored surface 72 of reflector 66 provides a reflecting surface of high reflectivity and the reflecting surface of greatest reflecting intensity when reflector 66 is in its forward or day position. In operation, mirror assembly 22 may be adjusted to any angular position by operation of cables 42, 44 and 46, there being sufficient clearance between the outer rim of the mirror-retaining member 98 and the wall 16 of the hood 14 to permit such adjustment. Shifting between the day and night positions, is accomplished by applying tension to cable 120 thus drawing the reflector rearwardly for obtaining the night position and permitting spring 114 to return reflector 66 forwardly against the stops 76 for its day position.

Figure 4:
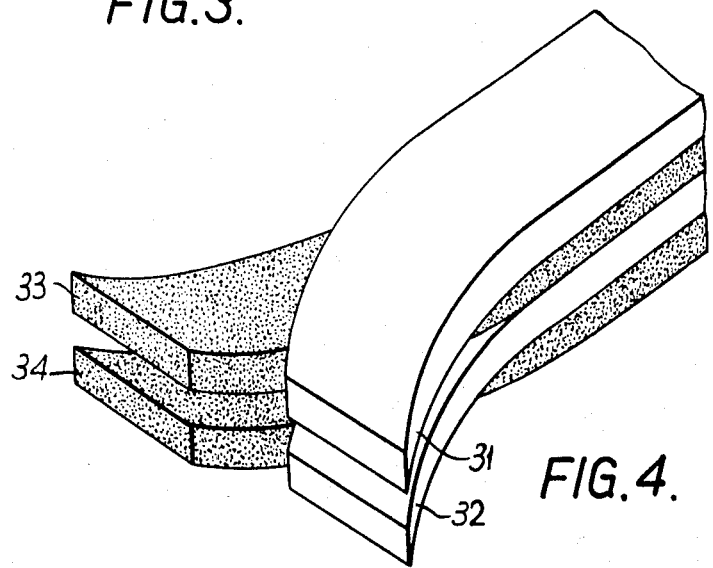

Referring now to FIG. 4 an alternate arrangement is shown for effecting a seal between diaphragm 64, frame 62 and window 60. The figure also shows an alternate arrangement for connecting a mirror-actuating means to mirror 60. In this embodiment, plate 116 is bonded directly to mirror 66 and diaphragm 64 overlaps and is bonded to the back of plate 116.

FIG. 5 shows another arrangement for effecting a seal between diaphragm 64, frame 62 and window 60 wherein the diaphragm is clamped between window 60 and frame 62.

It will be apparent that various changes and modifications may be made in the described construction without departing from the spirit and intent of the invention.

What I claim is:

1. In a fluid mirror of the type comprising;
   enclosure means defined at least in part by a transparent window and a resilient diaphragm,
   light-reflecting mirror and an optically dense fluid medium in the enclosure, and
   means for moving the mirror toward and away from the window between day and night positions respectively,
   the improvement comprising in combination therewith a substantially impermeable flexible coating covering at least the side of the diaphragm interior of the enclosure for substantially sealing it against the transmission and loss of the fluid.

2. The mirror of claim 1 wherein the diaphragm comprises an elastomeric material.

3. The mirror of claim 2 wherein the coating comprises a metal foil.

4. The mirror of claim 2 wherein the coating is aluminum foil.

5. The mirror of claim 4 wherein the foil is about 0.0015 inch thick.

6. The mirror of claim 4 wherein the aluminum foil is bonded to the diaphragm by an adhesive 7. The mirror of claim 2 wherein the elastomer is Buna-N.

8. The mirror of claim 1 wherein the coating covers both sides of the diaphragm.

9. The mirror of claim 2 wherein the elastomer is Buna-N and the coating is aluminum foil.

UNITED STATES PATENT OFFICE
Certificate of Correction

Patent No. 3,582,186　　　　　　　　　　　　　　　　　　　　　June 1, 1971

George E. Platzer, Jr.

It is certified that error appears in the above-identified patent and that said Letters Patent are hereby corrected as shown below.

Cancel the three sheets of drawings and insert the drawing shown below:

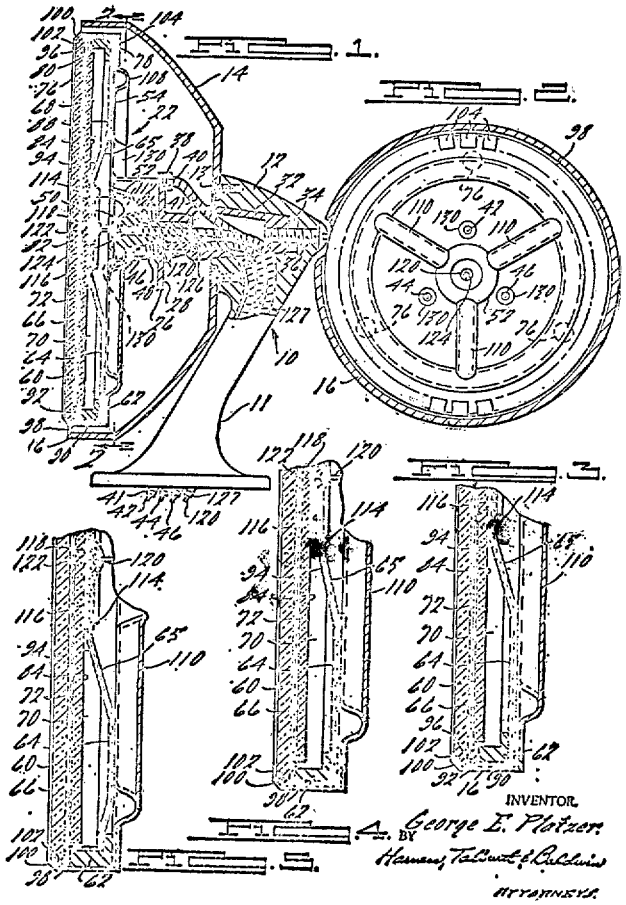

Signed and sealed this 16th day of May 1972.

[SEAL]

Attest:

EDWARD M. FLETCHER, JR.,　　　　　　　　　　　　　　　ROBERT GOTTSCHALK,
*Attesting Officer.*　　　　　　　　　　　　　　　　　　　*Commissioner of Patents.*